US007254635B2

(12) United States Patent
Gonno et al.

(10) Patent No.: US 7,254,635 B2
(45) Date of Patent: Aug. 7, 2007

(54) APPARATUS AND METHOD FOR PRODUCING AND MANAGING DATA FOR OPTIMIZING THE DELIVERY OF MULTIMEDIA CONTENT

(75) Inventors: Yoshihisa Gonno, Kanagawa (JP); Fumihiko Nishio, Tokyo (JP); Tomohiro Tsunoda, Tokyo (JP); Yasuaki Yamagishi, Kanagawa (JP)

(73) Assignee: Sony Corporation (JP)

( * ) Notice: Subject to any disclaimer, the term of this patent is extended or adjusted under 35 U.S.C. 154(b) by 737 days.

(21) Appl. No.: 09/826,166

(22) Filed: Apr. 4, 2001

(65) Prior Publication Data

US 2001/0047419 A1 Nov. 29, 2001

(30) Foreign Application Priority Data

Apr. 7, 2000 (JP) .......................... P2000-107200

(51) Int. Cl.
  *G06F 15/173* (2006.01)
(52) U.S. Cl. ........................ 709/229; 709/232; 725/93; 370/468
(58) Field of Classification Search ........ 718/102–104; 709/202, 225, 217, 219, 223, 238, 235, 236, 709/203, 229, 232; 345/721; 725/93, 94, 725/135; 370/231, 324, 329; 715/731
See application file for complete search history.

(56) References Cited

U.S. PATENT DOCUMENTS

| | | | | |
|---|---|---|---|---|
| 5,940,071 A | | 8/1999 | Treffers et al. ............. 345/327 |
| 6,002,915 A | * | 12/1999 | Shimizu .................... 434/350 |
| 6,041,359 A | * | 3/2000 | Birdwell .................... 709/238 |
| 6,058,422 A | * | 5/2000 | Ayanoglu et al. ........... 709/226 |
| 6,078,348 A | * | 6/2000 | Klosterman et al. .......... 725/40 |
| 6,134,584 A | * | 10/2000 | Chang et al. ............... 709/219 |
| 6,216,173 B1 | * | 4/2001 | Jones et al. ................. 345/705 |
| 6,240,460 B1 | * | 5/2001 | Mitsutake et al. .......... 709/235 |
| 6,330,225 B1 | * | 12/2001 | Weber et al. ............... 370/231 |
| 6,360,368 B1 | * | 3/2002 | Chawla ....................... 725/94 |
| 6,385,647 B1 | * | 5/2002 | Willis et al. ................ 709/217 |
| 6,473,096 B1 | * | 10/2002 | Kobayashi et al. ......... 715/731 |
| 6,477,180 B1 | * | 11/2002 | Aggarwal et al. .......... 370/468 |
| 6,477,707 B1 | * | 11/2002 | King et al. .................... 725/97 |
| 6,510,556 B1 | * | 1/2003 | Kusaba et al. ................ 725/93 |
| 6,539,003 B1 | * | 3/2003 | Agarwal et al. ............ 370/324 |
| 6,594,682 B2 | * | 7/2003 | Peterson et al. ............ 718/102 |
| 6,625,643 B1 | * | 9/2003 | Colby et al. ................ 709/217 |
| 6,698,023 B2 | * | 2/2004 | Levitan ...................... 725/135 |
| 6,757,912 B1 | * | 6/2004 | Vaughan et al. ............ 725/139 |
| 6,826,160 B1 | * | 11/2004 | Wang et al. ................ 370/329 |
| 2001/0023429 A1 | * | 9/2001 | Barker et al. ............... 709/203 |
| 2001/0037402 A1 | * | 11/2001 | Schneider ................... 709/236 |

FOREIGN PATENT DOCUMENTS

| | | |
|---|---|---|
| EP | 0836321 | 4/1998 |
| EP | 0917367 | 5/1999 |
| EP | 0957597 | 11/1999 |
| EP | 0989751 | 3/2000 |
| WO | WO9929108 | 6/1999 |
| WO | WO9949663 | 9/1999 |

* cited by examiner

*Primary Examiner*—Jungwon Chang
(74) *Attorney, Agent, or Firm*—Lerner, David, Littenberg, Krumholz & Mentlik, LLP

(57) ABSTRACT

A managing apparatus for managing data necessary for providing a content is disclosed, that includes a reserving element for reserving a delivery resource for each content, a storing element for storing reserved delivery resource assignment information, and a transmitter for transmitting the reserved delivery resource assignment information.

9 Claims, 9 Drawing Sheets

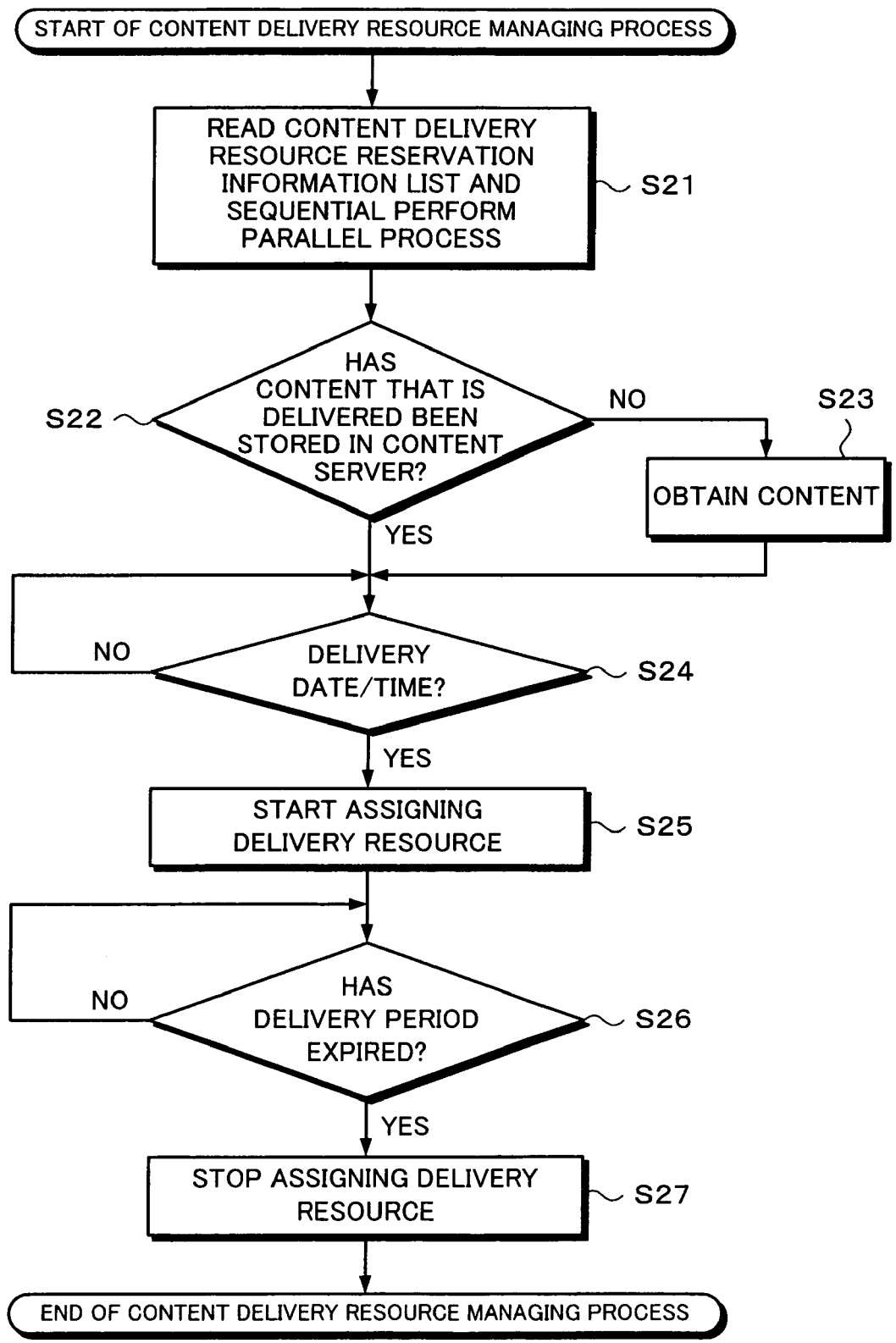

APPARATUS AND METHOD FOR PRODUCING AND MANAGING DATA FOR OPTIMIZING THE DELIVERY OF MULTIMEDIA CONTENT

BACKGROUND OF THE INVENTION

1. Field of the Invention

The present invention relates to a managing apparatus and a managing method for managing data necessary for delivering a content composed of a picture, a sound, and characters, and other data that are delivered.

2. Description of the Related Art

In the conventional CS (Communication Satellite) digital broadcast corresponding to the MPEG2 (Moving Picture Experts Group Phase 2) system, bands (channels) assigned to individual contents are pre-designated. A content provider creates a transmission schedule for a content with a pre-designated band and provides the content under the total control of a broadcasting station as a delivering device for each channel. As the number of channels of the digital broadcast increases, the number of content providers increases. In addition, the provided contents are diversified and the content providers are distributed.

Thus, conventionally, bands, broadcast time, and so forth assigned to contents are totally managed. Thus, a content provider can not select a transmission band, transmission time, and a transmission path by his or her preference. For example, when a content provider transmits a content through a particular channel, he or she should request the broadcasting station that manages the channel to reserve designated transmission band and time for the content.

In the environment that the number of content providers increases and they are distributed, when the broadcasting station side totally manages transmission bands and transmission time for contents, the flexibility of transmission bands and transmission time for contents is lost. A content provider may want to deliver a content with his or her convenient band and time from view points of the provided content, expected number of audiences, the cost, and so forth. However, the conventional content delivering system cannot satisfy the needs of content providers.

OBJECTS AND SUMMARY OF THE INVENTION

Therefore, an object of the present invention is to provide a managing apparatus and a managing method that allow a content provider to designate his or her desired transmission band, transmission time, and so forth for a content that he or she will provide.

A first aspect of the present invention is a managing apparatus for managing data necessary for providing a content, comprising a reserving means for reserving a delivery resource for each content, a storing means for storing reserved delivery resource assignment information, and a transmitting means for transmitting the reserved delivery resource assignment information.

A second aspect of the present invention is a managing method corresponding to the first aspect of the present invention.

A third aspect of the present invention is a managing apparatus for managing data necessary for providing a content, comprising a content list displaying means for displaying a list of contents that can be provided, a reservation state displaying means for displaying a reservation state of a delivery resource, a content selecting means for selecting a content to which a resource is assigned, and an operating means for assigning a delivery resource to the selected content.

A fourth aspect of the present invention is a managing method corresponding to the third aspect of the present invention.

According to the present invention, delivery resources for individual contents can be totally managed. In addition, distributed content providers can reserve delivery resources. Thus, when limited delivery resources are shared by a plurality of content providers, delivery resources can be dynamically assigned corresponding to conveniences of the individual content providers. As a result, delivery resources can be effectively used.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 9 is a flow chart for explaining a content delivery resource managing process according to the embodiment of the present invention.

DETAILED DESCRIPTION OF THE PREFERRED EMBODIMENTS

Figure 1:
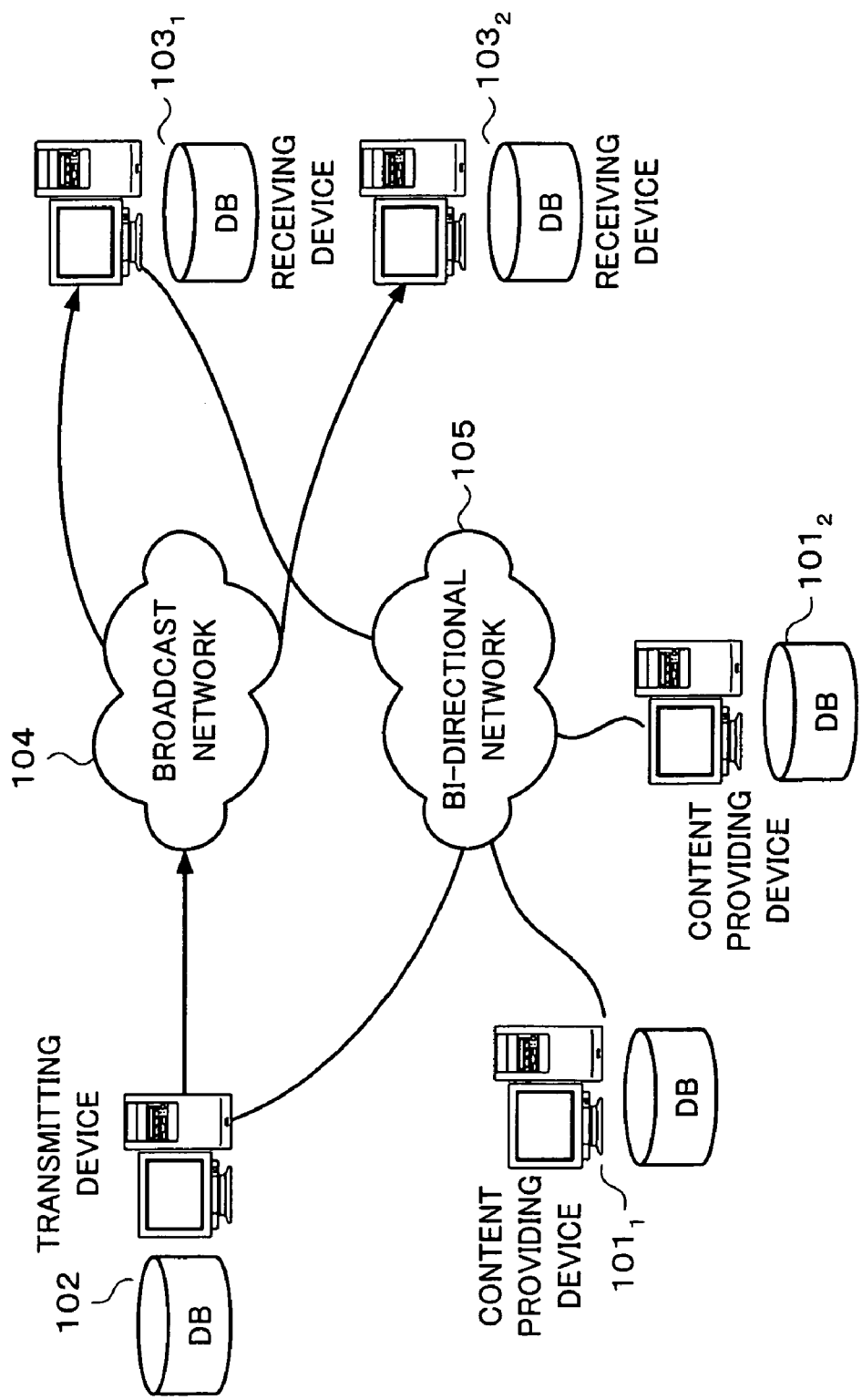
FIG. 1 is a schematic diagram showing an example of a content delivering system according to the present invention.

FIG. 1 shows an outlined structure of a content delivering system according to an embodiment of the present invention. Content providing device 101$_1$ and 101$_2$ store content data and meta data thereabout to respective databases. Content data is a multimedia content such as a television program that contains video data and/or audio data of news, sports, or the like, a radio program, or a movie played in a theater. Content data can be uniquely identified with a content identifier. In addition, data that can be identified with a content identifier can be handled as a content that is provided. FIG. 1 shows two content providing devices. Alternatively, one content providing device may be disposed. Further alternatively, three or more content providing devices may be disposed. The content providing device 101$_1$ and 101$_2$ provide content data and meta data to a transmitting device (for example, a broadcasting station) 102 through a bi-directional network 105 such as the Internet.

The transmitting device 102 stores content data and meta data that are provided in its database. Content data and meta data are provided by the content delivering devices $101_1$ and $101_2$. Alternatively, content data and meta data are created by the transmitting device 102. An example of content data is a broadcast program. The transmitting device 102 delivers content data, meta data, and content access information to receiving devices $103_1$ and $103_2$ through a multicast network 104 such as a digital broadcast. FIG. 1 shows only two receiving devices $103_1$ and $103_2$. In reality, three or more receiving devices are disposed.

In addition, the content providing devices $101_1$ and $101_2$ can deliver content data, meta data, and content access information to the receiving devices $103_1$ and $103_2$ through the bi-directional network 105. In other words, in the system shown in FIG. 1, the receiving devices $103_1$ and $103_2$ can receive content data, meta data, and content access information through other networks that are different from the multicast network 104 and the bi-directional network 105.

The receiving devices $103_1$ and $103_2$ are owned by individual users. The receiving devices $103_1$ and $103_2$ store received content data, meta data, and content access information to respective storing portions such as hard disks so as to structure their databases. In addition, the receiving devices $103_1$ and $103_2$ have respective data displaying portions such as LCDs (Liquid Crystal Displays) that display data for the respective users.

Figure 2:
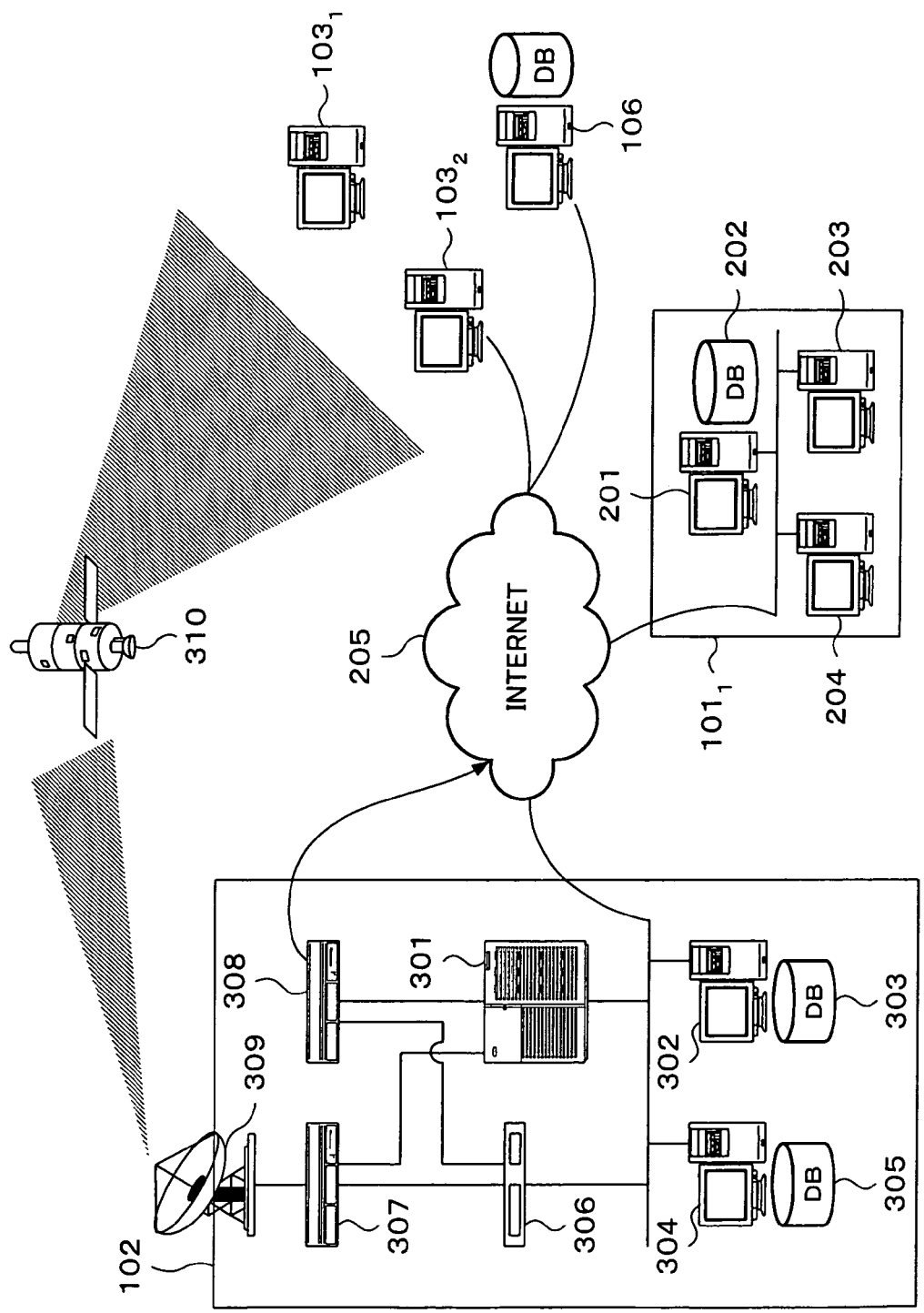
FIG. 2 is a block diagram showing an example of a more detailed structure of a content delivering system according to an embodiment of the present invention.

FIG. 2 shows a more detailed structure of a delivering system. The content providing device $101_1$ is composed of a database 201, a content server 202, a program information client 203, and a delivery resource reserving client 204. The structure of other content providing devices is the same as the structure of the content providing device $101_1$. The content providing device $101_1$ is for example a program production company.

The database 201 stores data that the content providing device $101_1$ requires. The content server 202 is connected to the transmitting device 102 through the Internet 205 that is an example of the bi-directional network 105. The content providing device $101_1$ provides its content to the transmitting device 102 through the Internet 205.

The program information client 203 communicates with a program information server 302 of the transmitting device 102 through the Internet 205. The program information is information about a content that is provided. Examples of program information are a genre of a program, a program name, and actor and actress names. The delivery resource reserving client 204 communicates with a delivery resource reserving server 304 of the transmitting device 102 through the Internet 205. Thus, the content providing device $101_1$ can reserve a part of delivery resources.

In more reality, the delivery resource reserving client 204 is composed of a user interface portion and a slave database. The user interface portion is used to browse a band reservation state, register it, and change it. The slave database is a partial replication of a master database 305 (transmitting device 102). The master database 305 manages meta information. The slave database is composed of a part of the database 202.

The delivery resource reserving client 204 not only browses the current band blank state through a user interface as a band reservation screen, but assigns a band to each content (program) corresponding to a contract class. Attributes of contract classes are for example speed assurance type, total capacity assurance type, and best effort type.

As the user interface, a band and time corresponding to a file capacity are displayed and (when necessary) shaped by a drag and drop operation on the desktop. A reservation and a change performed by the delivery resource reserving client 204 are updated to (synchronized with) the master database 305.

The transmitting device 102 comprises a content server 301, a program information server 302, a program information database 303, a delivery resource reserving server 304, a delivery resource database 305, a complex data sending server 306, an MPEG multiplexing device 307, and an IP multiplexing device 308. The content server 301 stores a content provided by the content providing device $101_1$ through the Internet 205. Multimedia data is output from the content server 301 to the MPEG multiplexing device 307. The content server 301 contains an archiver for the Internet. The archiver outputs data to the IP multiplexing device 308.

The program information server 302 communicates with the program information client 203 of the content providing device $101_1$ and manages program information. In other words, the program information server 302 totally manages the database 303 for meta information of registered television programs and meta information of multimedia contents. The database 303 is a master database for all meta information. Data of registered programs and reserved bands in the slave databases (202) in a distributed environment is totally managed by the program information server 302. Replicated meta information is supplied to each slave database.

The delivery resource reserving server 304 communicates with the delivery resource reserving client 204 of the content providing device $101_1$ and manages reservations of delivery resources. In other words, the delivery resource reserving server 304 manages a band assignment schedule of all the broadcast band assigned to the transmitting device 102. The delivery resource reserving server 304 is composed of a master database 305 and a user interface portion. The master database 305 manages individual delivery data as individual programs. The user interface portion is used to browse and operate the delivery resource reservation state. As with a television program, meta information such as a title and a remark of a content is added to the individual delivery data. Thus, individual delivery data can be contained as one program in a time table of regular television programs (this time table is referred to as EPG (Electronic Program Guide)). The databases 303 and 305 may be integrated.

The complex data sending server 306 multiplexes data other than content data and generates complex data. The complex data sending server 306 sends the generated complex data to the MPEG multiplexing device 307 and the IP multiplexing device 308. The MPEG multiplexing device 307 multiplexes the complex data and content data supplied from the content server 301 and transmits the multiplexed data through a transmission antenna 309. Complex data and content data are delivered through a satellite 310 such as a CS (Communication Satellite) or a BS (Broadcast Satellite). Alternatively, a program may be delivered using a ground wave rather than a satellite. The IP multiplexing device 308 delivers complex data and content data through the Internet 205.

FIG. 2 shows the receiving devices $103_1$ and $103_2$ and a receiving and content providing device 106. These receiving devices have functions for reserving the reception of a content (program), receiving and storing the reserved content, and managing the stored content. In addition, the receiving device $103_1$ receives a broadcast wave delivered through the satellite 310. The receiving device $103_2$ receives a broadcast wave delivered through the satellite 310. In addition, the receiving device $103_2$ is connected to the Internet 205. The receiving device $103_2$ is an Internet television set of which a dedicated browser and a dedicated modem are built in a television set that receives a satellite broadcast. Multimedia data that has been encoded corresponding to the MPEG4 system or the like and file-formatted is transmitted to the Internet television set.

Like with the receiving device $103_2$, the receiving and content providing device 106 has a function for providing a content to the transmitting device 102 through the Internet 205 along with the function of the Internet television set. Although the receiving and content providing device 106 has the same content providing function as the content providing device $101_1$, normally, the performance of the receiving and content providing device 106 is inferior to the performance of the content providing device $101_1$.

Figure 3:
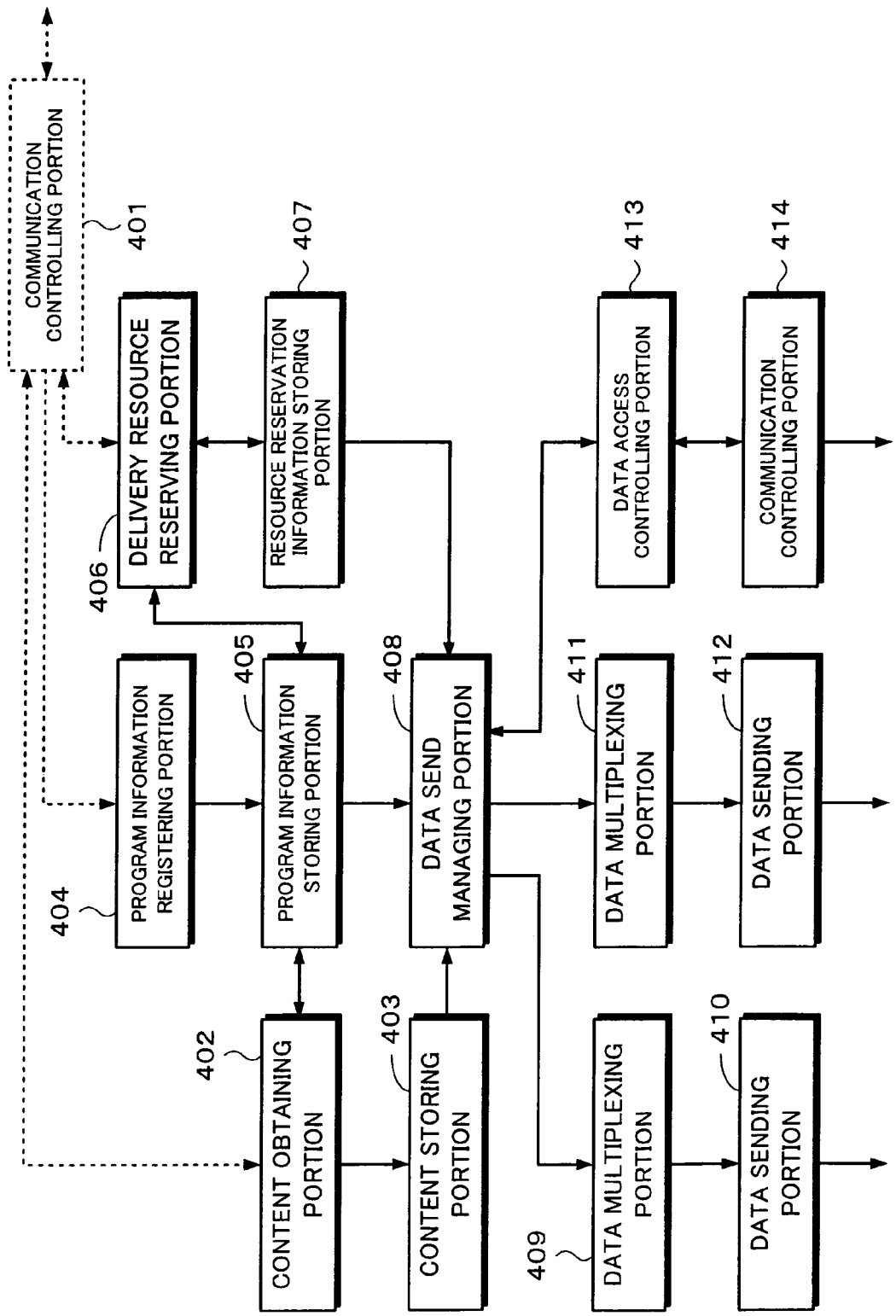
FIG. 3 is a block diagram showing an example of a content transmission managing device of a transmitting device.

Further, the embodiment of the present invention will be described. FIG. 3 shows a more detailed structure of the transmitting device 102. Reference numeral 401 represents a communication controlling portion that communicates with a content providing device ($101_1$, 102, 106). Multimedia content data, program information (generally, content information) and delivery resource reservation information are communicated between the communication controlling portion 401 and a content providing device. Content data supplied from the communication controlling portion 401 is stored to a content storing portion 403 through a content obtaining portion 402.

Program information supplied from the communication controlling portion 401 is stored to a program information storing portion 405 through a program information registering portion 404. The program information registering portion 404 registers titles, genres, time, and so forth of all contents that are delivered along with content identifiers and stores them to the program information registering portion 404.

Delivery resource reservation information supplied from the communication controlling portion 401 is stored to a resource reservation information storing portion 407 through a delivery resource reserving portion 406. The delivery resource reserving portion 406 performs a reserving process for assigning a transmission band and transmission time or the capacity of a storage medium necessary for transmitting a content as a delivery resource. Resource reservation information is stored to the resource reservation information storing portion 407. The program information storing portion 405 and the delivery resource reserving portion 406 are connected. A data send managing portion 408 is connected to the content storing portion 403, the program information storing portion 405, and the resource reservation information storing portion 407. The data send managing portion 408 manages the sending of reservation information of content data, program information, and delivery resources.

A data multiplexing portion 409, a data multiplexing portion 411, and a data access controlling portion 413 are connected to the data send managing portion 408. The data multiplexing portion 409 multiplexes content data, program information, and resource reservation information and supplies the multiplexed data to a data sending portion 410. The data sending portion 410 converts the multiplexed data into a transmission signal corresponding to for example the MPEG2 system. In other words, the data multiplexing portion 409 and the data sending portion 410 correspond to the MPEG multiplexing device 307 (see FIG. 2). The data multiplexing portion 411 and a data sending portion 412 have the same functions as the data multiplexing portion 409 and the data sending portion 410, respectively. A transmission signal sent from the data sending portion 412 is transmitted through the Internet 205. In such a manner, content data and so forth are encoded and formatted corresponding to information contained in resource reservation information.

In addition, a communication controlling portion 414 is disposed. The communication controlling portion 414 controls a communication between the receiving device $103_2$ and the receiving and content providing device 106 through the Internet 205. The communication controlling portion 414 accepts a content delivery request and performs a delivering process for a requested content under the control of the data access controlling portion 413. In addition, the content obtaining portion 402, the program information registering portion 404, and the delivery resource reserving portion 406 are connected to the communication controlling portion 401. Thus, they can be remotely operated.

In FIG. 3, signal paths including the communication controlling portion 401 are denoted by dotted lines. These signal paths represent that the transmitting device 102 may communicate with the receiving device $103_2$ and the receiving and content providing device 106 through another communication path other than the Internet 205 (in other words, a dedicated line or the like). In addition, content data may be supplied to the transmitting device 102 with a medium that records the content data.

In the relation between the structure shown in FIG. 3 and the structure shown in FIG. 2, the content storing portion 403 corresponds to the content server 301; the program information registering portion 404 and the program information storing portion 405 correspond to the program information server 302 and the database 303; and the content obtaining portion 402, the delivery resource reserving portion 406, and the resource reservation information storing portion 407 correspond to the delivery resource reserving server 304 and the database 305.

Delivery resources can be reserved through a multicast network (for example, a digital broadcast), a bi-directional network (for example, the Internet), and a storage medium (an archiver of the Internet). A content providing device can manage the sending of data corresponding to its convenient transmission path, transmission time, and storage duration.

Figure 4:
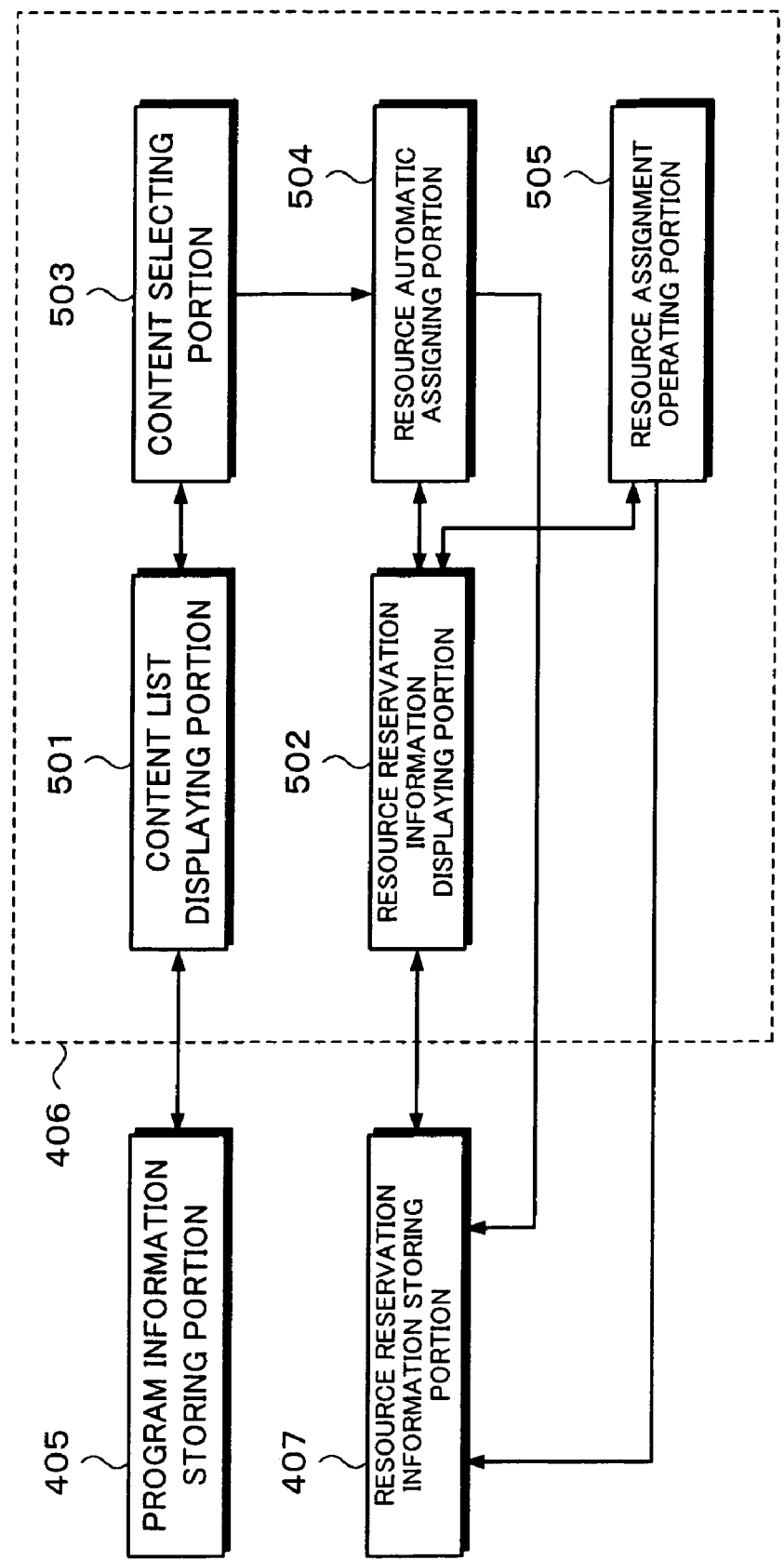
FIG. 4 is a block diagram showing an example of a content delivery resource reserving device of the transmitting device.

FIG. 4 shows a more detailed structure of a portion that reserves delivery resources. The delivery resource reserving portion 406 comprises a content list displaying portion 501, a resource reservation information displaying portion 502, a content selecting portion 503, a resource automatic assigning portion 504, and a resource assignment operating portion 505. The content selecting portion 503 selects a desired content from a content list and issues a resource assigning instruction for delivering the selected content. The resource automatic assigning portion 504 calculates the minimum band resource or the minimum storage resource necessary for delivering the selected content corresponding to the program information thereof, assigns an initial value of the delivery resource, and displays the assigned value.

The resource assignment operating portion 505 can change the initial value with reference to an indication displayed on the resource reservation information displaying portion 502. The resource reservation information changed by the resource assignment operating portion 505 is stored in the resource reservation information storing portion 407.

Figure 5:
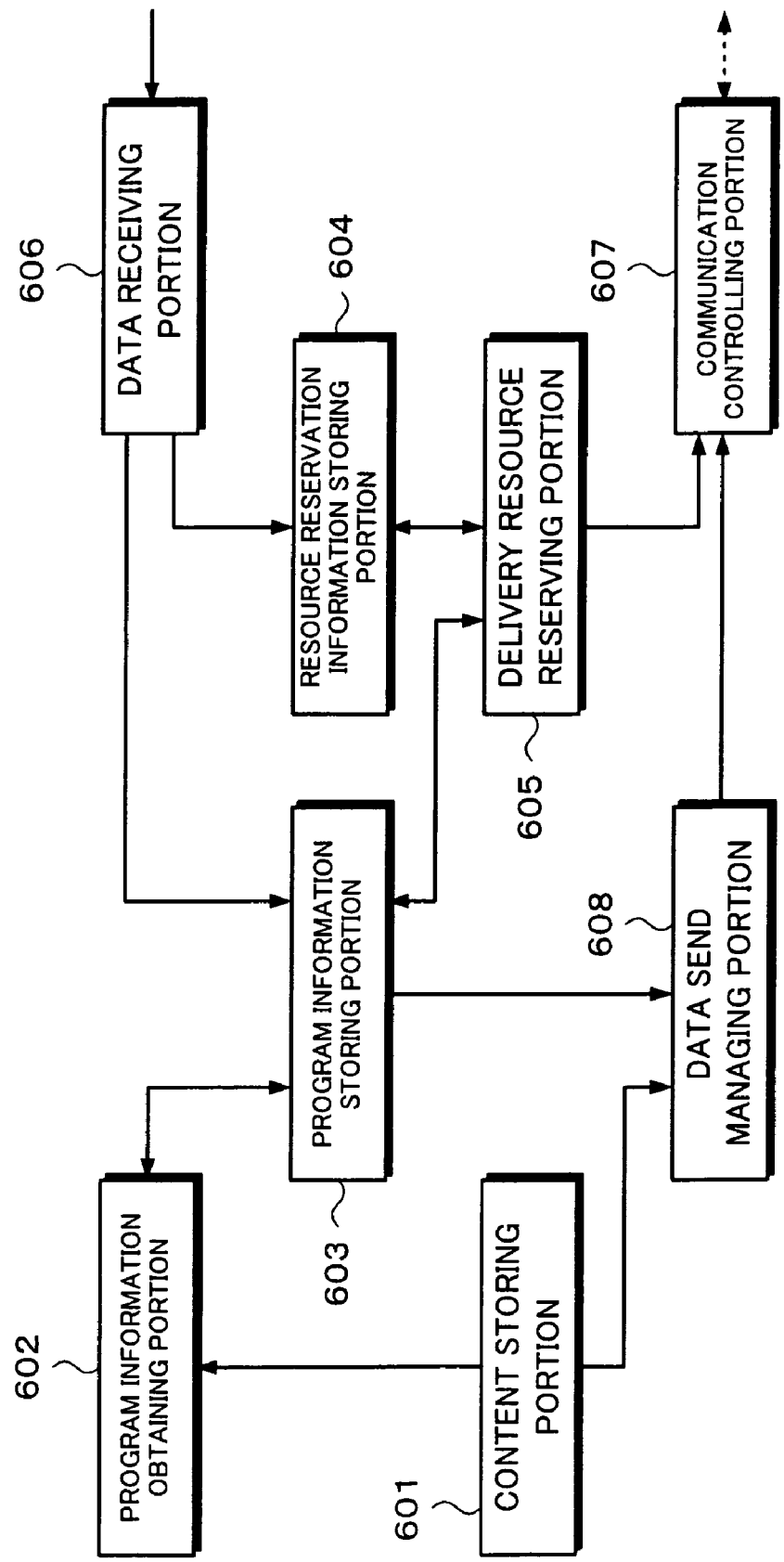
FIG. 5 is a block diagram showing an example of the structure of a content providing device.

FIG. 5 shows a structure of a resource reserving portion of a content providing device. Reference numeral 601 represents a content storing portion that stores content data (multimedia data). The content storing portion 601 corresponds to the content server 202 of the system structure shown in FIG. 2. Reference numeral 602 represents a program information operating portion. Reference numeral 603 represents a program information storing portion. The program information operating portion 602 and the program information storing portion 603 correspond to the program information client 203 of the system structure shown in FIG. 2.

Reference numeral 604 represents a resource reservation information storing portion. Reference numeral 605 represents a delivery resource reserving portion. The resource reservation information storing portion 604 and the delivery resource reserving portion 605 correspond to the delivery resource reserving client 204 of the system structure shown in FIG. 2. Data transmitted through a multicast network for example a digital satellite broadcast is received by a data receiving portion 606. Program information contained in the received data is stored to the program information storing portion 603. The resource reservation information contained in the received data is stored to the resource reservation information storing portion 604. The resource reservation information represents the contents resource reservation state. The resource reservation information may be received through a bi-directional network (for example, the Internet).

The content storing portion 601 stores a content that is delivered. Program information necessary for delivering a content is created by the program information operating portion 602. The created program information is stored to the program information storing portion 603. The delivery resource reserving portion 605 reserves a delivery resource corresponding to program information stored in the program information storing portion 603 and program reservation information stored in the resource reservation information storing portion 604. Reservation operation information for a delivery resource is transmitted to the transmitting device 102 through a communication controlling portion 607 and the Internet 205. Thus, in the structure shown in FIG. 3, the reservation operation for a delivery resource performed by a content providing device is reflected to the delivery resource reserving portion 406.

Program information supplied from the program information storing portion 603 is transmitted to the transmitting device 102 through the data send managing portion 608, the communication controlling portion 607, and the Internet 205. Thus, in the structure shown in FIG. 3, the program information is reflected to the program information registering portion 404. The data reflected to the delivery resource reserving portion 406 and the program information registering portion 404 are transmitted to all the content providing devices and receiving devices through the data send managing portion 408 and synchronized.

When a resource has been successfully reserved, content data stored in the content storing portion 601 shown in FIG. 5 is temporarily stored to a content storing portion of the data send managing portion 608 so as to transmit a real content from the transmitting device 102. A content is transmitted in a format, an encoding method, and so forth corresponding to the reserved resource through the communication controlling portion 607 and the Internet 205.

The structures shown in FIGS. 3, 4, and 5 can be accomplished with software as well as hardware.

Figure 6:
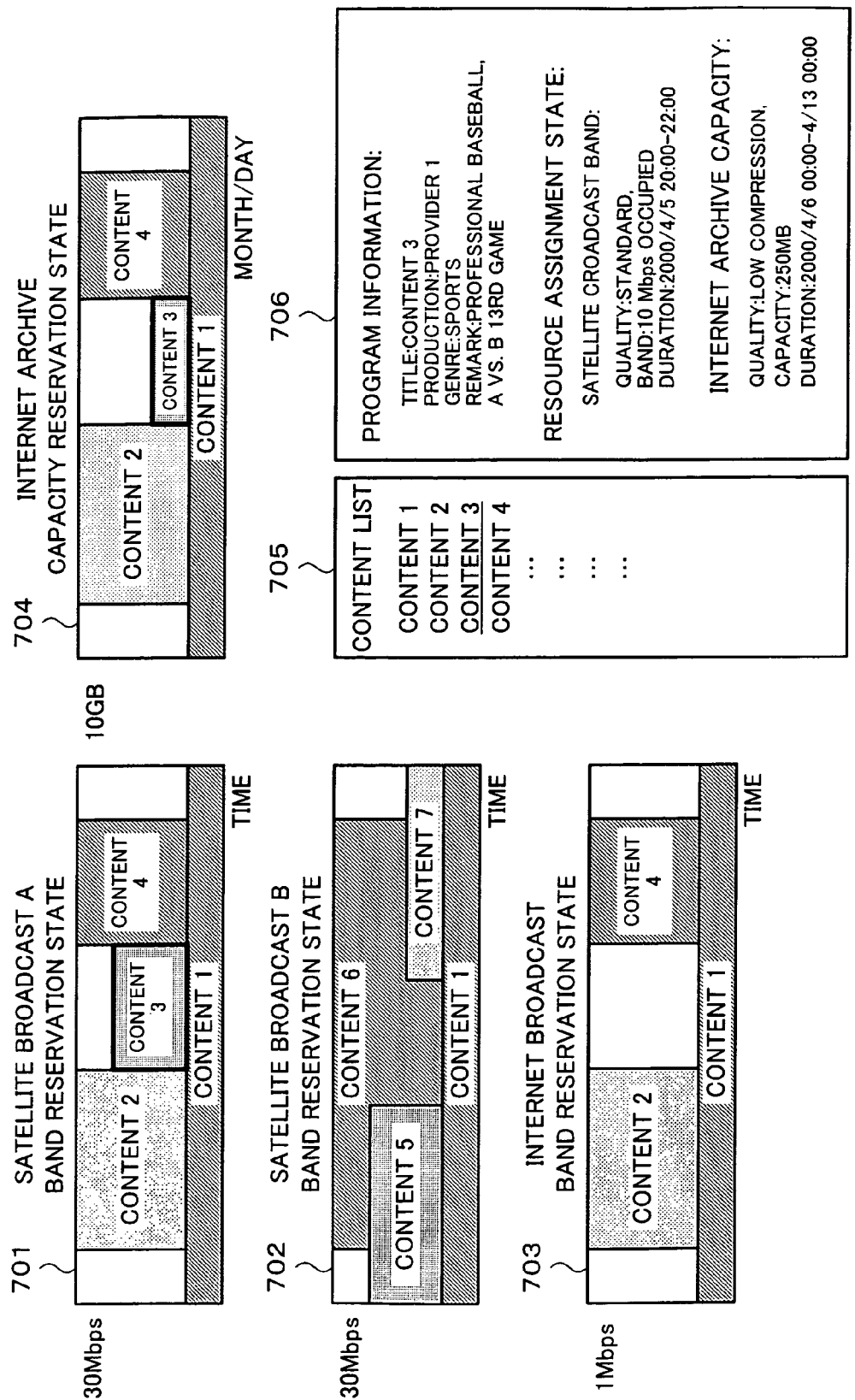
FIG. 6 is a schematic diagram showing an example of a delivery resource reservation management screen of the transmitting device.

FIG. 6 shows an example of a delivery resource reservation management screen displayed by the resource reservation information displaying portion 502 (see FIG. 4) of the delivery resource reserving portion 406 of the transmitting device 102. The delivery resource reservation management screen is used to manage information of all contents managed in the system and assign all delivery resources on a list. Indications on the delivery resource reservation management screen shown in FIG. 6 may be in a window format or a tab format.

In the example shown in FIG. 6, a satellite broadcast A band reservation state indication 701, a satellite broadcast B band reservation state indication 702, an Internet broadcast band reservation state indication 703, and an Internet archive capacity reservation state indication 704 are displayed. The satellites A and B correspond to respective transponders. The vertical axis represents a band (Mbps) or a capacity (GB), whereas the horizontal axis represents a time axis or month/day. For example, the band of a satellite broadcast is 30 Mbps and the band of an Internet broadcast is 1 Mbps. In FIG. 6, shaded portions such as Content 1 represent reserved portions. Non-shaded portions represent blank portions. In FIG. 6, for simplicity, reserved portions are shaded. In reality, contents are represented in different colors corresponding to content providers.

In the satellite broadcast A band reservation state indication 701, a narrow band is reserved for Content 1. Content 1 is a content such as music data having a relatively narrow band. Content 2 and Content 4 are for example high picture quality contents. Content 2 and Content 4 are reserved for most of the 30 Mbps band. Content 3 is a normal picture quality content. In the satellite broadcast B, the band assigned for Content 6 varies. This is because each receiving device temporarily stores received data and then reproduces the stored data. Thus, when it is not necessary to assign all the band to a content, the remaining band can be assigned on the best effort basis. In FIG. 6, reference numerals such as Content 1 are assigned for identifying contents. In other words, the reference numbers do not have meanings.

In addition, contents delivered to receiving devices through the Internet are stored to an Internet archive. Thus, the month/day on the horizontal axis of the indication 704 represents the period for which contents are stored in the archive. A content is delivered with a reserved band to receiving devices. As a band is larger, a content can be delivered to receiving devices in a shorter time.

As shown at a lower right portion of FIG. 6, the delivery resource reservation management screen displays a list of all contents managed by the system is displayed. The content list displaying portion 501 of the delivery resource reserving portion 406 (see FIG. 4) displays a list indication. The list indication is composed of a list 705 that display a list of contents and an indication 706 that displays the details of a content selected on the list 705 and assigned information of the selected content.

When an item contained in the list 705 is dragged and dropped to a blank area of the reservation state indications 701 to 704, a new delivery resource can be assigned. When the length of the assigned area is dragged and changed, the resource reservation date and time and the duration can be adjusted.

In the example shown in FIG. 6, Content 3 has been selected on the list. Thus, information about Content 3 is displayed in the program and assigned information indication 706. As program information of Content 3, for example, a title ("Content 3"), a production ("Provider 1"), a genre ("sports"), a remark ("professional baseball, A vs. B, 13rd game") are displayed. As a resource assignment state, a satellite broadcast band and an Internet archive capacity are displayed. In this example, in the satellite broadcast A band reservation state indication 701 and the Internet archive capacity reservation state indication 704, a resource for Content 3 has been reserved. In the satellite broadcast A band reservation state indication 701 and the Internet archive capacity reservation state indication 704, the reserved area is highlighted in a particular color different from colors of other areas. With reference to information displayed with the program and assigned information indication 706, resource assignment information can be designated.

Figure 7:
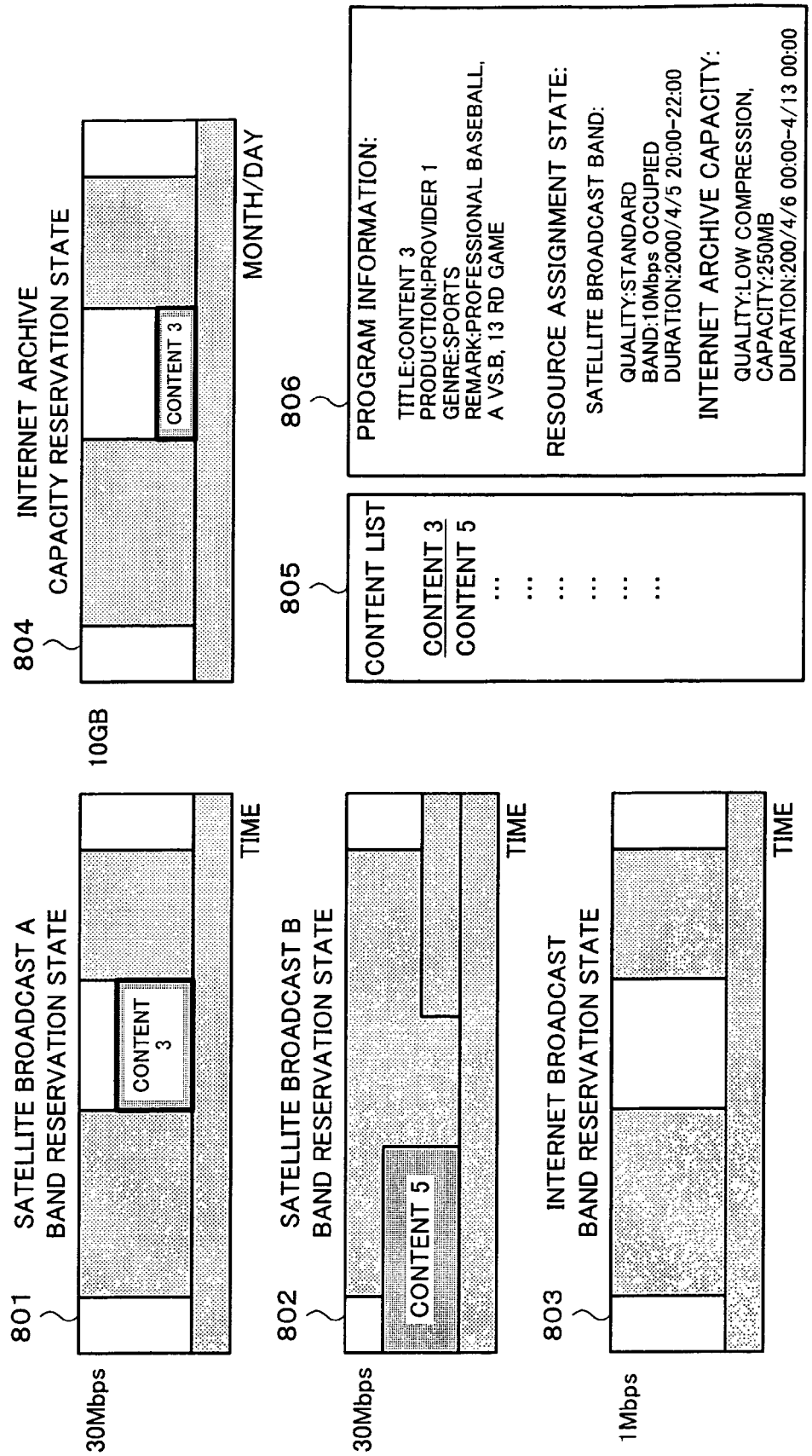
FIG. 7 is a schematic diagram showing an example of the delivery resource reservation management screen of the content providing device.

FIG. 7 shows an example of a delivery resource reservation screen displayed by the delivery resource reserving portion 605 of each content providing device. With the content providing device, the resource reservation state of the entire system can be browsed. However, with the content providing device, only a content thereof can be operated.

The delivery resource reservation screen shown in FIG. 7 corresponds to the delivery resource reservation screen (see FIG. 6) provided by a transmitting device. In other words, a satellite A band reservation state indication 801, a satellite broadcast B band reservation state indication 802, an Internet broadcast band reservation state indication 803, and an Internet archive capacity reservation state indication 804 are displayed. In these indications, reserved areas for a band and time (or month/day) are distinguished from blank areas. In addition, a content list 805 and a detail and assigned information indication 806 are displayed. The list 805 displays contents that the local content providing device can provide. The indication 806 displays the detail of a content selected on the list 805 and assigned information of the selected content.

The list 805 displays Content 3, Content 5, and so forth that the local content providing device can provide. Contents of other content providing devices are not displayed on the list 805. On the list 805, Content 3 has been selected. When an item (content) displayed on the list 805 is dragged and dropped to a blank area of the reservation state indications 801 to 804, a new delivery resource can be reserved. When the length of the assigned area is changed by a drag operation, the resource reservation date/time and the duration can be adjusted. With the delivery resource reservation operation shown in FIG. 7, the delivery resource reservation shown in FIG. 6 is remotely performed. Of course, the delivery resource reservation operation can be performed with the transmitting device.

Figure 8:
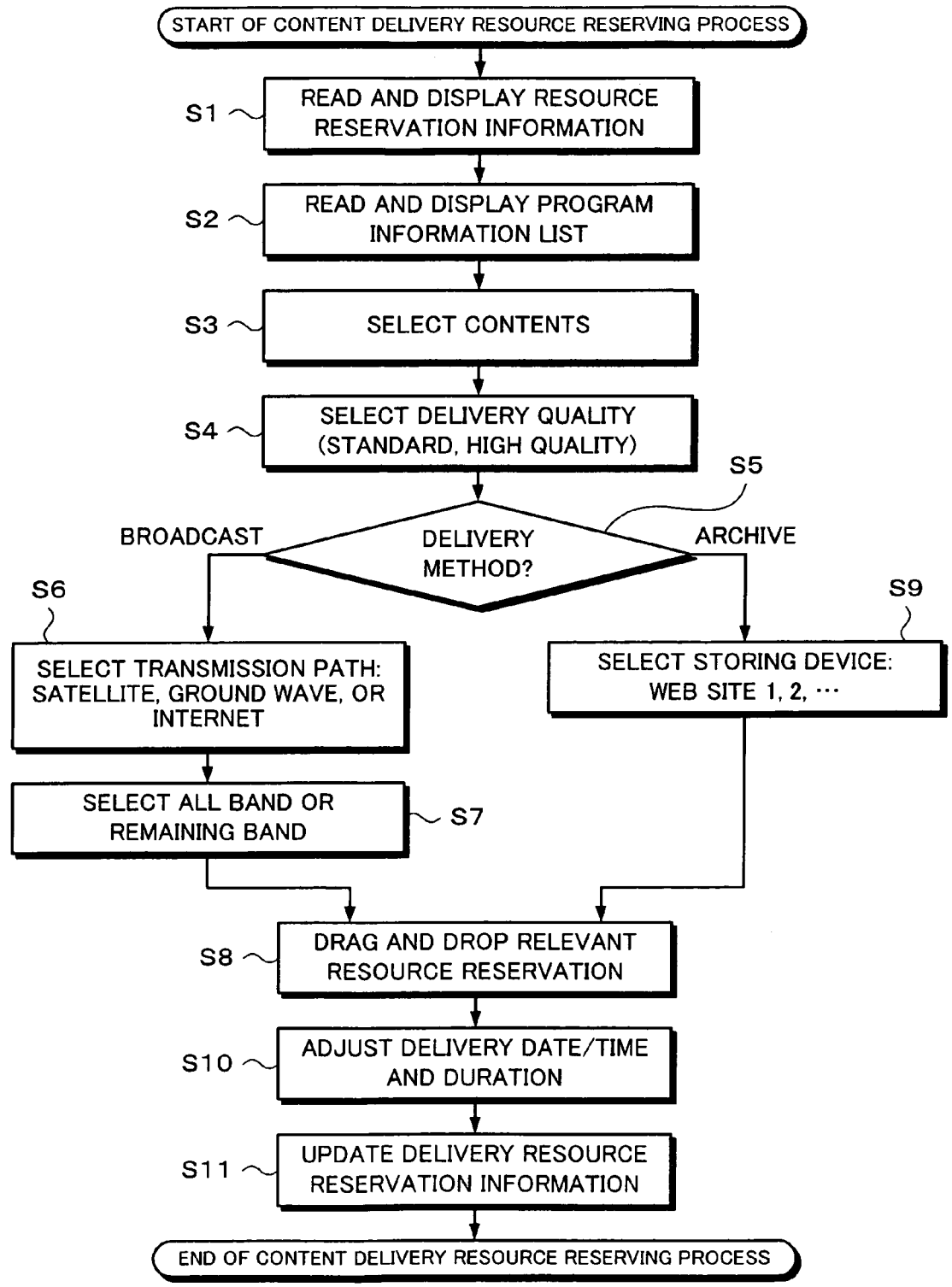
FIG. 8 is a flow chart for explaining a content delivery resource reserving process according to the embodiment of the present invention.

FIG. 8 is a flow chart for explaining the content delivery resource reserving process. At step S1, resource reservation information is read. Corresponding to the resource reservation information, the delivery resource reservation screen (see FIG. 6 or FIG. 7) is displayed. At step S2, program information and content list are read. Corresponding to these information, the detailed and assigned information indication 706 or 806 is displayed.

A content is selected by the above-described drag and drop operation (at step S3). At step S4, the delivery quality of the selected content is selected. The delivery quality is for example one of standard picture quality, high picture quality, and so forth. At step S5, the delivery method is selected. In this example, one of broadcast and archive is selected.

When the broadcast has been selected at step S5, the flow advances to step S6. At step S6, a transmission path is selected. The transmission path is for example one of satellite, ground wave, and Internet. At step S7, all the band or a remaining band is selected. At step S8, a relevant resource reservation (the stripe shaped indication 701 or the like shown in FIG. 6 or FIG. 7) is dragged and dropped.

When the archive is selected as the delivery method at step S5, the flow advances to step S9. At step S9, a storage device is selected. For example, one of web site 1, web site 2, and so forth is selected. The relevant resource reservation is dragged and dropped (at step S8).

Thereafter, the flow advances to step S10. At step S10, the date/time and duration of the delivery are adjusted by for example the drag operation. At step S9, the delivery resource reservation information is updated. In such a manner, the content delivery resource reserving process is performed. As was described above, the content delivery resource reserving process performed by a content providing device is the same as the content delivery resource reserving process performed by a transmitting device.

Next, with reference to FIG. 9, the content delivery resource managing process performed by a transmitting device will be described. At step S21, the content delivery resource reserving information list is read. In addition, a sequential parallel process is performed. In other words, a managing process is started in parallel for each content delivery resource reservation information.

At step S22, it is determined whether or not the content server stores a content that is delivered. When the content server does not store it, a content is obtained (at step S23). When the content server stores the content or it has been obtained, the flow advances to step S24. At step S24, it is determined whether or not the current date/time is the delivery date/time. When the current date/time is the delivery date/time, a delivery resource is assigned (at step S25).

At step S26, it is determined whether or not the delivery duration has expired. When the delivery duration has expired, the assignment of the delivery resource is completed (at step S27). As a result, the content delivery resource managing process is completed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, according to the embodiment of the present invention, both content data and data for managing a content (program information, resource reservation information, and so forth) are handled by a transmitting device or a content providing device. Alternatively, only data for managing a content can be handled corresponding to the present invention. At that point, content data may be stored at another location.

According to the present invention, when data necessary for providing a content is managed, delivery resources for individual contents can be totally managed. In addition, distributed content providers can reserve delivery resources. Thus, when limited delivery resources are shared by a plurality of content providers, the delivery resources can be dynamically assigned. Thus, the delivery resources can be effectively used.

What is claimed is:

1. A managing apparatus for managing data necessary for delivering a digital content, comprising:
   reserving means for reserving a delivery resource for the content;
   means for selecting a method from among two delivery methods for delivering the content;
   assigning means for adjusting a bandwidth and a transmission time necessary for delivering the content and for assigning the bandwidth and the transmission time to the reserved delivery resource;
   storing means for storing the bandwidth and the transmission time to the reserved delivery resource; and transmitting means for transmitting an information of the content and the reserved delivery resource information that includes the bandwidth and the transmission time,
wherein a plurality of content providers can request a reservation via a network,
wherein a reservation state can be browsed by each content provider,
wherein reserved content in the browsed reservation state is displayable in different methods of a display corresponding to each said content provider,
wherein a delivery resource is assigned corresponding to a convenience of a content provider, and
wherein the transmission time includes information indicative of a start time and an end time for delivering the content.

2. A managing apparatus for managing data necessary for delivering a digital content, comprising:
content list displaying means for displaying a list of contents that can be delivered;
reservation state displaying means for displaying a reservation state of a delivery resource;
content selecting means for selecting a content from said displayed list of contents;
operating means for assigning a delivery resource for delivering the selected content as an area on the reservation state displaying means by drag and drop operation from the list of contents to the reservation state of a delivery resource;
means for selecting a method from among two delivery methods for delivering the selected content; and
assignment means for calculating a bandwidth and a transmission time necessary for delivering the selected content by shaping the area,
wherein a plurality of content providers can request a reservation via a network,
wherein a reservation state can be browsed by each content provider,
wherein reserved content in the browsed reservation state is displayable in different methods of a display corresponding to each said content provider,
wherein a delivery resource is assigned corresponding to a convenience of a content provider,
wherein the transmission time includes information indicative of a start time and an end time for delivering the content, and
wherein the assignment means includes means for enabling the transmission time to be adjusted.

3. The managing apparatus as set forth in claim 1 or 2, further comprising:
transmitting means for transmitting the content using the assigned bandwidth and transmission time.

4. The managing apparatus as set forth in claim 1 or 2, further comprising:
converting means for converting the format of each content corresponding to a reserved delivery resource.

5. The managing apparatus as set forth in claim 1 or 2, wherein a transmission resource is reserved for each content, the transmission resource being composed of a limited transmission band and transmission time, and
wherein each content is transmitted corresponding to the reserved transmission resource information.

6. The managing apparatus as set forth in claim 1 or 2, wherein a delivery resource is assigned in such a manner that a plurality of transmission paths is selected.

7. The managing apparatus as set forth in claim 1 or 2, wherein a delivery resource can be reserved from one or more distributed environments.

8. A managing method for managing data necessary for delivering a digital content, comprising the steps of:
reserving a delivery resource for the content;
selecting a method from among two delivery methods for delivering the content;
adjusting a bandwidth and a transmission time necessary for delivering the content and assigning the bandwidth and the transmission time to the reserved delivery resource;
storing the bandwidth and the transmission time to the reserved delivery resource; and
transmitting an information of the content and the reserved delivery resource information that includes the bandwidth and the transmission time,
wherein a plurality of content providers can request a reservation via a network,
wherein a reservation state can be browsed by each content provider,
wherein reserved content in the browsed reservation state is displayable in different methods of a display corresponding to each said content provider,
wherein a delivery resource is assigned corresponding to a convenience of a content provider, and
wherein the transmission time includes information indicative of a start time and an end time for delivering the content.

9. A managing method for managing data necessary for delivering a digital content, comprising the steps of:
displaying a list of contents that can be delivered;
displaying a reservation state of a delivery resource;
selecting a content from said displayed list of contents;
assigning the delivery resource for delivering the selected content as an area on the reservation state displaying means by drag and drop operation from the list of contents to the reservation state of a delivery resource;
selecting a method from among two delivery methods for delivering the selected content; and
calculating a bandwidth and a transmission time necessary for delivery the selected content by shaping the area,
wherein a plurality of content providers can request a reservation via a network,
wherein a reservation state can be browsed by each content provider,
wherein reserved content in the browsed reservation state is displayable in different methods of a display corresponding to each said content provider,
wherein a delivery resource is assigned corresponding to a convenience of a content provider, and
wherein the transmission time includes information indicative of a start time and an end time for delivering the content, and
wherein the calculating step includes enabling the transmission time to be adjusted.

* * * * *